(12) United States Patent
Kneer et al.

(10) Patent No.: US 8,573,626 B2
(45) Date of Patent: Nov. 5, 2013

(54) COUPLER FOR A VEHICLE

(75) Inventors: Bernd Kneer, Viernheim (DE); Klaus Mayer, Hesseneck-Kailbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/181,582

(22) Filed: Jul. 13, 2011

(65) Prior Publication Data

US 2012/0025487 A1     Feb. 2, 2012

(30) Foreign Application Priority Data

Aug. 2, 2010 (DE) .......................... 10 2010 038 766

(51) Int. Cl.
*B60R 16/00* (2006.01)

(52) U.S. Cl.
USPC ............................................. 280/420; 701/70

(58) Field of Classification Search
USPC ................. 280/420, 421, 456.1, 427, 428
See application file for complete search history.

(56) References Cited

U.S. PATENT DOCUMENTS

| | | | |
|---|---|---|---|
| 5,677,667 A | 10/1997 | Lesesky et al. | |
| 6,250,650 B1 * | 6/2001 | Douglas | 280/6.155 |
| 7,253,721 B2 * | 8/2007 | Flohr et al. | 340/431 |
| 7,322,594 B2 * | 1/2008 | Liljeblad et al. | 280/415.1 |
| 2005/0189761 A1 | 9/2005 | Halverson et al. | |
| 2008/0012695 A1 | 1/2008 | Herschell et al. | |

FOREIGN PATENT DOCUMENTS

EP    1580043 A1    9/2005

OTHER PUBLICATIONS

EP Search Report in Counterpart European Application No. 11175633 (4 pages) (Jun. 21, 2013).

* cited by examiner

*Primary Examiner* — Tony Winner
*Assistant Examiner* — Jacob Knutson

(57) ABSTRACT

A tractor includes a vehicle coupler which couples with a trailer brake coupler to connect it to a pressure source for the trailer brake system. The pressure source is driven by a controllable drive unit, and an electronic control unit controls the activation of the drive unit. The vehicle coupler includes a first sensor which is connected to the control unit and which senses when the trailer coupler is coupled to the vehicle coupler. The control unit controls the activation of the drive unit in response to the sensor in order to prevent the pressure source from being driven unnecessarily.

8 Claims, 3 Drawing Sheets

COUPLER FOR A VEHICLE

FIELD OF THE INVENTION

The present disclosure relates to a vehicle coupler for coupling to a trailer coupler of a trailer brake system.

BACKGROUND OF THE INVENTION

In contrast to continuous brake systems which are used, for example, in trucks, semi-continuous brake systems are used in agricultural tractors. Such semi-continuous brake systems include two energy sources that are operated independently of one another, wherein one energy source is assigned to a tractor brake system and the other energy source is assigned to a trailer brake system. It is furthermore known to provide traction vehicles such as, for example, agricultural tractors, trucks, semi-trailer trucks, construction vehicles or other vehicles designed for towing or hauling, with coupling devices for trailer brake systems, to which a corresponding trailer coupler of the trailer brake system can be coupled when the trailer is connected to the tractor. A pressure-conducting connection between the tractor and the trailer can be produced by connecting the coupling devices of the tractor and the trailer, wherein this connection makes it possible to operate, for example, a trailer brake system in a pressure-controlled or pneumatic fashion. The required compressed air is generated with a compressor that is arranged on the tractor and driven by a drive unit, for example, via a belt drive that is connected to the engine of the tractor.

It is common practice for the tractor to continuously generate the system pressure required for a trailer brake system regardless of whether a trailer is coupled to the tractor. In order to conserve energy and fuel, however, the compressor is operated only when the system pressure for the trailer brake system drops below a predetermined nominal value. In this respect, corresponding sensors and pressure control devices may be provided, wherein the compressor controlled by means of an electronic control unit can be switched on and off in dependence on said sensors and pressure control devices. For example, the compressor is switched off when a predetermined system pressure is reached. The system pressure for the trailer brake system also drops if no trailer is coupled to the tractor, for example, due to the actuation of the tractor brake system or operational leaks in the tractor. In this case, the system pressure is once again raised to the level of the predetermined nominal value by switching on the compressor in a controlled fashion. Consequently, the compressor is also repeatedly switched on during the operation of the tractor when no trailer is coupled to the tractor such that unnecessary losses of energy occur and the fuel efficiency deteriorates.

SUMMARY

According to an aspect of the present disclosure, a vehicle coupler includes a first sensor which is connected to a control unit and which senses when a trailer coupler is coupled to the vehicle coupler. The trailer coupler is coupled to a trailer brake system. A drive unit drives a pressure source which generates a system pressure for the trailer brake system. The drive unit is activated by the control unit in dependence on the sensor. Consequently, the drive unit is activated or driven only when the sensor delivers a corresponding signal that confirms the coupling or connection of a trailer coupler to the vehicle coupler. In other words, the pressure source for the trailer brake system is activated only when a trailer is actually coupled to the tractor. Consequently, undesirable or unnecessary losses of energy caused by generating system pressure for the trailer brake system during the operation of the tractor without a trailer are prevented in a tractor with semi-continuous brake system.

The coupling devices are usually provided with a rotary or bayonet joint of sorts such that the two coupling devices can be rotationally connected to one another. It would also be possible to utilize other connections that are commonly used in pneumatic systems such as, for example, plug connections. The first sensor may be arranged, for example, directly on the vehicle coupler in the form of a mechanical tactile or contact sensor or switch. It would also be possible to utilize electric, electromagnetic, or optical sensors. As soon as a trailer coupler is connected in order to connect a brake pressure line, the sensor delivers a corresponding signal to the electronic control unit that in turn generates a corresponding control signal for activating the drive unit. Consequently, a corresponding system pressure for a trailer brake system is generated.

The vehicle coupler may also include a second sensor which is connected to the control unit and which senses when a trailer coupler is coupled to the vehicle coupler. The second sensor may be arranged, for example, directly on the vehicle coupler in the form of a mechanical tactile or contact sensor or switch. In this respect, however, it would also be possible to utilize an electric, electromagnetic, or optical sensor. The second sensor may serve, for example, for signaling the correct coupling of the trailer brake system and is arranged such that it delivers a signal only when the two coupling devices are completely connected to one another.

It would furthermore be possible to provide a signaling device that, is activated by the control unit. This makes it possible, for example, to send a signal to an operator in the cab of a tractor indicating that the two coupling devices are correctly and completely connected to one another, in dependence on the first, the second, or both sensors. When a trailer is coupled to the tractor, the first sensor may activate the drive unit of the pressure source, wherein a master control may furthermore be realized by means of the second sensor. For example, when the first sensor delivers a signal and the second sensor delivers a signal simultaneously, a control lamp in the cab may be activated or a control sound may be generated in order to inform the operator of the correct coupling of the trailer brake system. On the other hand, an error signal can be generated, for example, if only the first sensor delivers a signal and the second sensor does not deliver a corresponding signal. Furthermore, the electronic control unit may also generate a control signal if neither of the two sensors delivers a corresponding signal and therefore indicates that the trailer brake system is not connected. In this case, the signaling device may comprise an optical display, as well as an acoustical indication.

The drive unit for the pressure source may be a hydraulic, electronic, or mechanical drive. It would be possible, for example, to provide a belt drive that is driven by an internal combustion engine of the tractor. However, it would also be possible to provide a drive that operates independently of the internal combustion engine and is realized in the form of an electric motor powered by a generator or even a hydraulic motor.

The drive unit may be a controllable clutch, by means of which the transmission of a driving torque of a drive of any type to a pressure source can be activated or deactivated. For example, an electromagnetic clutch may be provided and controlled by the electronic control unit. However, it would also be possible to use other types of clutches such as, for example, mechanical or electromechanical clutches that feature corresponding actuators controlled by the control unit.

The pressure source may be an air compressor that can be driven by a drive of the above-described type with or without an intermediately arranged clutch. The air compressor generates a system pressure required for the trailer brake system. In order to store the compressed air, a pressure tank or compressed air reservoir is filled by the pressure source when a trailer is connected in order to make available the corresponding system pressure required for a fast braking maneuver. Another module or means that generates compressed air may also be used instead of the compressor.

The pressure source and the control unit may be connected to sensor, in dependence on which the control unit may activate the drive unit. When a trailer is coupled to the tractor, for example, the system pressure can be monitored with the sensor means in order to generate a corresponding signal for activating the drive unit of the pressure source at an insufficient system pressure or for maintaining or raising the system pressure at/to a certain nominal value. If the signaled system pressure is excessively low, for example, the clutch of the drive unit can be connected and a corresponding driving torque for driving the compressor can be transmitted.

The sensors may comprise, for example, a pressure control valve and/or a pressure switch connected to a brake pressure line in which a required system pressure should be generated or should be acted upon with a correspondingly required system pressure. When the required system pressure has been adjusted or said system pressure has dropped below a certain pressure level, a corresponding signal for activating the drive unit is generated by the pressure control valve and the pressure switch. This makes it possible, for example, to generate a signal for disconnecting the clutch of the drive unit at a sufficient system pressure and to generate a signal for connecting the clutch at an excessively low system pressure.

DETAILED DESCRIPTION OF THE DRAWINGS

Figure 1:
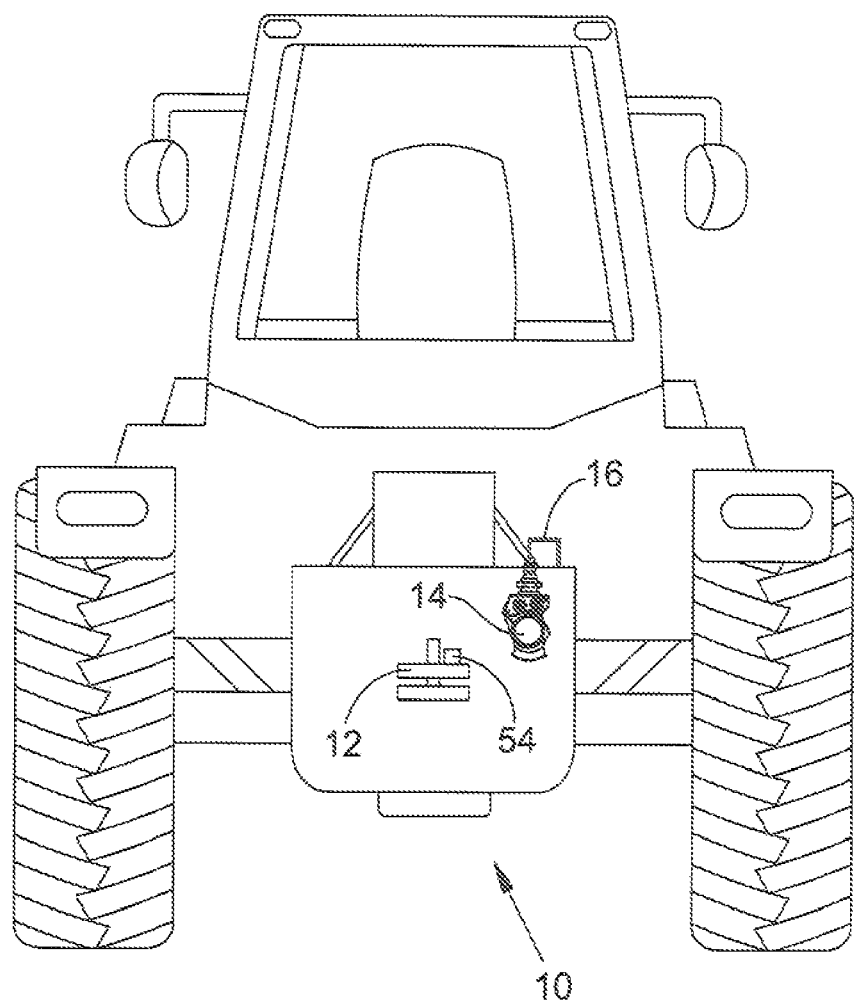
FIG. 1 is a schematic representation of the rear end of a tractor with a coupler.

FIG. 1 shows the rear end of a vehicle 10, such as an agricultural tractor, such as would have a semi-continuous brake system (not shown). The tractor 10 includes a vehicle coupler 12 for mechanically connecting to a trailer (not-shown), as well as a vehicle coupler 14 for connecting to a trailer coupler 15 which is connected to trailer brake system 17 arranged on the trailer. The coupling device 14 is connected to a brake pressure line 16 that supplies the trailer brake system 17 with a system pressure (compressed air).

Figure 2:
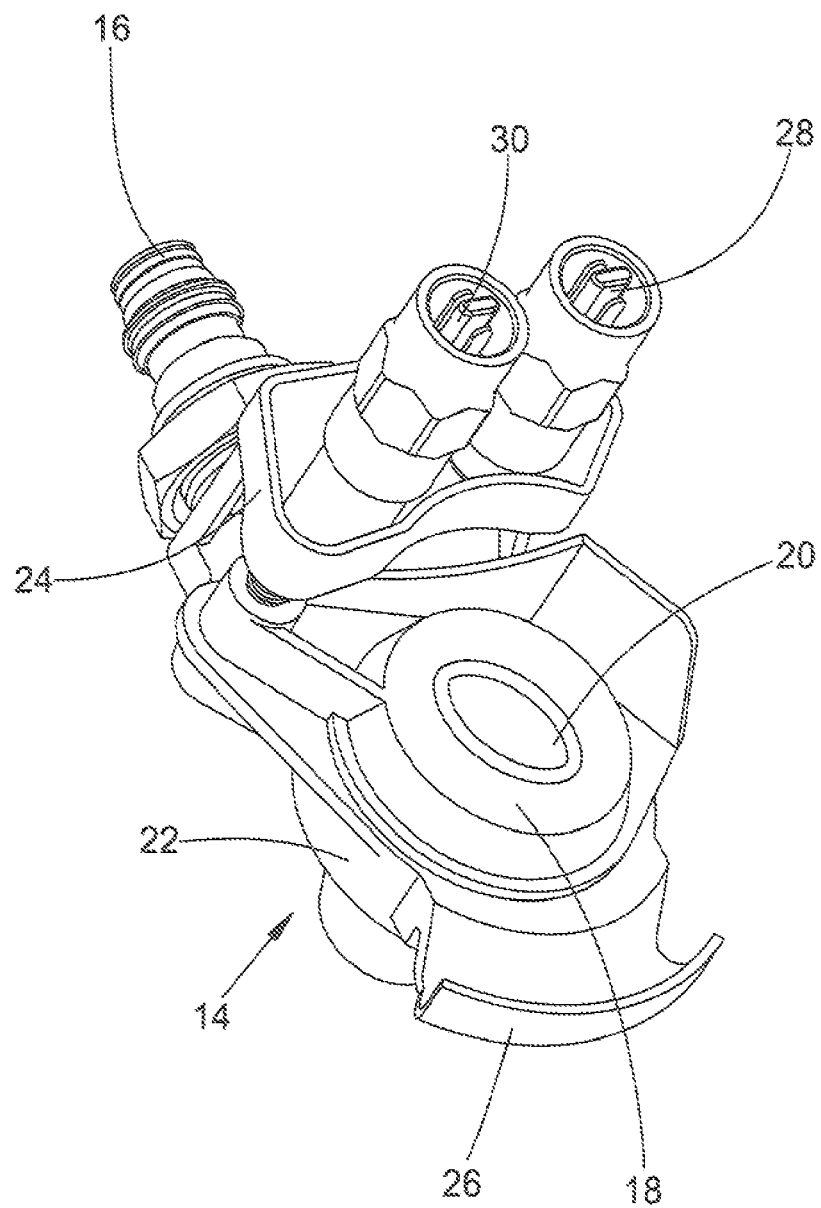
FIG. 2 is a perspective view of the coupler of FIG. 1.

Referring now to FIG. 2, the vehicle coupler 14 has a connection surface 18, wherein a valve opening 20 of a shut-off valve 22 that closes the brake pressure line 16 leads into said connection surface 18. Upper and lower locking tabs 24, 26 realized similar to a bayonet joint are furthermore provided on the edge region of the connection surface 18 and can be rotationally connected to complementary locking tabs (not-shown) provided on the trailer coupler 15. A detailed description of the coupling devices is not required because they consist of couplers that are known from the prior art and are commonly used on tractors that have such a coupler. A first and a second contact sensor 28, 30 arranged on the upper locking tab 24 can be brought in contact with one of the complementary locking tabs of the trailer coupler 15 as soon as the coupler 14 and the coupler 15 are connected to one another or the trailer brake system 17 is connected to the tractor. The two sensors 28, 30 are adjacently arranged on the lateral regions of the upper locking tab 24. When connecting the trailer, this results in the locking tab of the trailer coupler 15 initially moving over the first sensor 28, wherein the second sensor 30 does not come in contact with the complementary locking tab of the trailer coupler 15 until the rotary motion for producing the connection (bayonet joint) is nearly completed or the tractor locking tabs 24, 26 and the trailer locking tabs are almost congruently connected to one another. If the connection is not completely produced (the locking tabs of both coupling devices are only partially (i.e., not congruently) connected to one another), the trailer locking tab comes in contact with only the first sensor 28, but not with the second sensor 30. In this case, an error signal would be generated during the operation of the tractor and sent to the operator.

Figure 3:
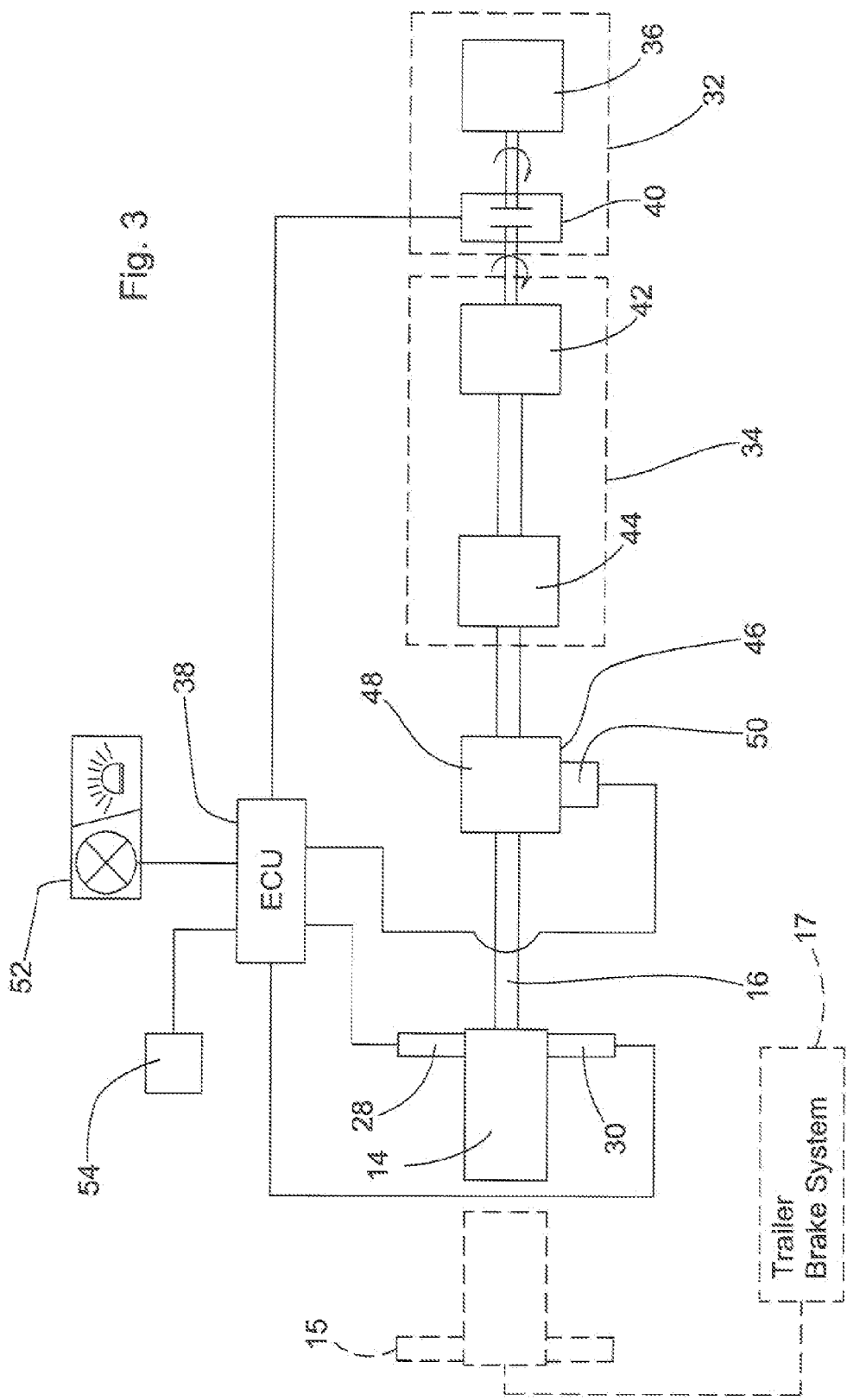
FIG. 3 is a schematic circuit diagram a system for activating a drive unit of a pressure source and which includes the coupler of FIG. 1.

FIG. 3 shows a system for activating a drive unit 32 for a pressure source 34. The drive unit 32 comprises a drive 36 such as, for example, a belt drive that is driven by an engine of the tractor 10 or an electric or hydraulic drive, as well as a clutch 40 that can be controlled by an electronic control unit 38. The controllable clutch 40 may be an electromagnetic clutch and can be disconnected and connected by means of corresponding control signals generated by the electronic control unit 38. The pressure source 34 includes an air compressor 42 and a compressed air reservoir 44 that is connected to the air compressor and makes available a required system pressure in the brake pressure line 16. A sensor 46 is arranged in the brake pressure line 16 in order to detect a prevailing system pressure in the brake pressure line 16 and to deliver a corresponding signal to the electronic control unit 38. The sensor 46 may be for example, a pressure control valve 48 and a pressure switch 50 connected thereto.

Additionally, a signaling device or display 52 is connected to the control unit 38 and sends corresponding control and/or error signals to an operator of the tractor 10.

The clutch 40 is engaged by the electronic control unit 38 as soon as a trailer brake system 17 is properly connected to the vehicle coupler 14 by means of the trailer coupler 15 and the system pressure in the brake pressure line 16 accordingly lies below a required nominal value. The connecting or coupling to the coupling device 14 is detected by the first sensor 28 and a corresponding signal is delivered to the control unit 38 that sends a control signal for disengaging the clutch 40. An appropriate and complete (congruent) coupling is furthermore detected by the second sensor and a corresponding second signal is delivered to the control unit 38 that sends a corresponding control signal to the signaling device 52. The signaling device indicates the control signal, for example, by activating a signaling lamp or by generating a control sound. If the coupling devices are incorrectly or incompletely coupled to one another, i.e., if only the first sensor delivers a signal and no signal is received from the second sensor, a corresponding error signal is indicated, for example, by activating a signaling lamp or by generating an alarm sound. It would furthermore be possible to provide another sensor 54 on the trailer coupler in order to send a signal indicating the presence of a coupled trailer to the control unit. If the control unit 38 were to receive such a signal from the additional sensor 54, but no signals from the first and the second sensor 28, 30, this would indicate that a trailer was in fact connected, but no trailer brake system. In this regard as well, a corresponding error signal (or control signal (when no trailer brake system is required or provided)) can be generated and indicated. When the trailer brake system 17 is connected or the coupler 14 is connected (as signaled by the sensors 28, 30), the system pressure in the brake pressure line 16 is detected by the sensor 46. If this system pressure lies or drops below a predetermined nominal value, a corresponding signal is also sent to the electronic control unit 38. Only then does the electronic control unit generate a corresponding signal for connecting the clutch 40 (i.e., when the sensors 28, 30 and the sensor 46 deliver corresponding signals) such that the pressure source 34 is driven until the required system pressure in the brake pressure line 16 is (once again) reached. As soon as the respective system pressure is reached, a corresponding signal is sent to the electronic control unit by the sensor 46 and a corresponding signal for disengaging the clutch 40 is generated.

The clutch 40 is held in the disengaged position by the electronic control unit 38 as soon as no trailer brake system is connected or a corresponding signal is received from the sensors 28, 30.

Instead of the clutch 40, it would also be possible to provide a direct drive that can be activated by the control unit such as, for example, an electric or hydraulic motor such that the drive unit 32 comprises only one drive that can be directly activated. Accordingly, this drive would activate the analog signals for engaging the clutch 40 and deactivate the analog signals for disengaging the clutch 40.

A tractor 10 with the above-described system ensures that the air compressor arranged on the tractor for a trailer brake system is driven or activated or operated only when a trailer brake system is actually connected to the tractor. This prevents unnecessary activations of the compressor when the system pressure in the brake line 16 or in the trailer brake system 17 drops and therefore results in energy and fuel savings.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A coupler system comprising:
   a trailer coupler coupled to a trailer brake system;
   a vehicle coupler for rotationally coupling to the trailer coupler, the vehicle coupler being connected to a vehicle brake system having a pressure source connected to a belt drive by a controllable clutch unit, the vehicle coupler having a valve opening and a locking tab;
   a first sensor mounted on the vehicle coupler, the first sensor sensing when the trailer coupler is coupled to the vehicle coupler;
   a second sensor is mounted to the vehicle coupler and senses when the trailer coupler is coupled to the vehicle coupler, the valve opening being positioned between the locking tab and the sensors; and
   an electronic control unit connected to the first and second sensors, the control unit activating the clutch unit in response to a signal from both sensors, indicating a correct coupling of the trailer brake system only when the two couplers are completely connected to one another.

2. The coupler of claim 1, wherein:
a signaling device is connected to and is activated by the control unit.

3. The coupler of claim 1, wherein:
the pressure source comprises an air compressor.

4. The coupler of claim 1, wherein:
the second sensor comprises a pressure control valve.

5. The coupler of claim 1, wherein:
the second sensor comprises a pressure switch.

6. A coupler system comprising:
   a trailer coupler coupled to a trailer brake system;
   a vehicle coupler for coupling to the trailer coupler, the vehicle coupler being connected to a vehicle brake system having a pressure source, the vehicle coupler having first and second locking tabs and a valve opening positioned between the locking tabs;
   first and second contact sensors mounted on one of the locking tabs, the sensors sensing when the trailer coupler is coupled to the vehicle coupler; and
   an electronic control unit connected to the first and second sensors, the control unit activating the pressure source in response to signals from the first and second sensors signaling a correct coupling of the vehicle coupler to the trailer coupler.

7. The coupler of claim 6, wherein:
the first and second sensors extend in a direction which is parallel to an axis of the valve opening.

8. A coupler system comprising:
   a trailer coupler coupled to a trailer brake system;
   a vehicle coupler for coupling to the trailer coupler, the vehicle coupler being connected to a vehicle brake system having a pressure source, the vehicle coupler having first and second locking tabs and a valve opening positioned between the locking tabs;
   a contact sensor mounted on one of the locking tabs, the sensor sensing when the trailer coupler is properly coupled to the vehicle coupler; and
   an electronic control unit connected to the sensor, the control unit activating the pressure source in response to a signal from the sensor signaling a correct coupling of the vehicle coupler to the trailer coupler.

* * * * *